United States Patent
Griffith, Jr.

[11] 3,971,222
[45] July 27, 1976

[54] SOIL STABILIZATION
[75] Inventor: Robert E. Griffith, Jr., Houston, Tex.
[73] Assignee: Robert Burke, Robstown, Tex. ; a part interest
[22] Filed: May 28, 1974
[21] Appl. No.: 473,892

[52] U.S. Cl................................................ 61/36 R
[51] Int. Cl.²........................................... E02D 3/12
[58] Field of Search............ 61/63, 36 R, 53.7, 53.5

[56] References Cited
UNITED STATES PATENTS

| | | | |
|---|---|---|---|
| 416,180 | 12/1889 | Neukirch | 61/36 R |
| 2,099,664 | 4/1937 | Watt | 61/53.7 |
| 2,357,769 | 9/1944 | Rushmer | 61/36 R |
| 3,243,962 | 4/1966 | Ratliff | 61/63 |
| 3,546,886 | 12/1970 | Jones et al. | 61/63 |
| 3,608,318 | 9/1971 | Levy et al. | 61/36 R |
| 3,783,624 | 1/1974 | Nakade et al. | 61/63 |
| 3,802,203 | 4/1974 | Ichise et al. | 61/36 R |

FOREIGN PATENTS OR APPLICATIONS 862,051  3/1961  United Kingdom................ 61/36 R Primary Examiner—Dennis L. Taylor
Attorney, Agent, or Firm—Carl B. Fox, Jr.

[57] ABSTRACT

Soil stabilization methods and apparatus whereby a material such as lime is introduced to soil beneath the earth's surface. The lime or other treating material is applied to the soil in slurry form. The slurried material may be introduced at depths from just beneath the ground surface down to depths of 15 to 20 feet, or even deeper.

4 Claims, 4 Drawing Figures

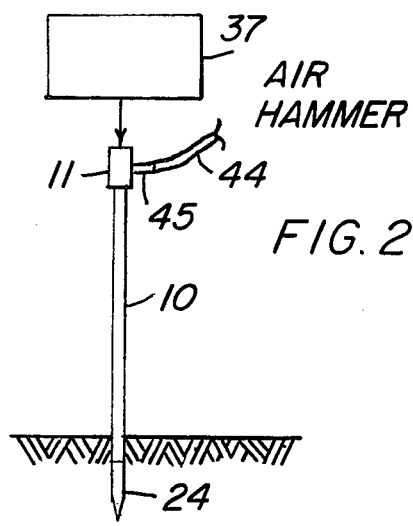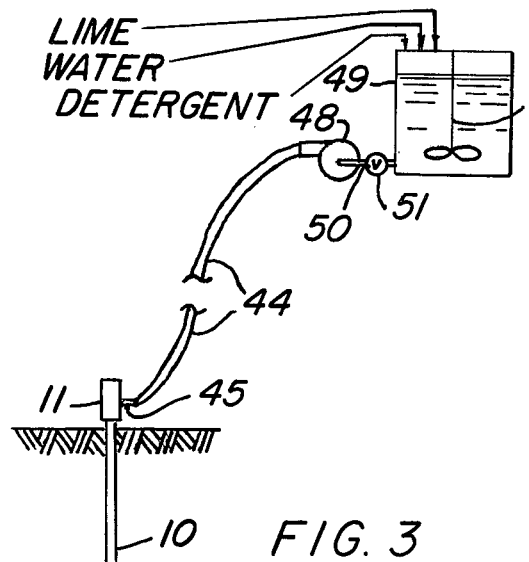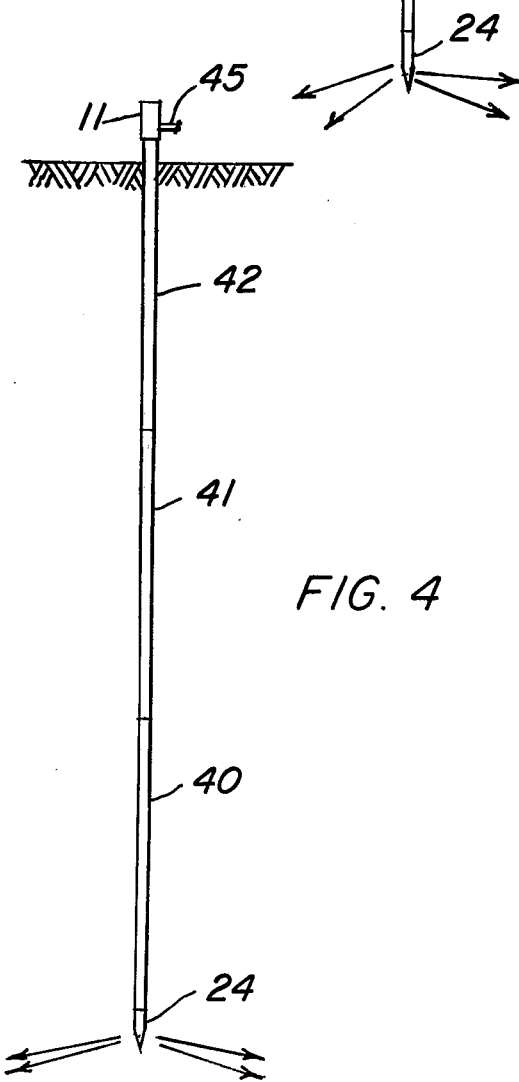

SOIL STABILIZATION

SUMMARY OF THE INVENTION

Instability of soils is a constant problem particularly with regard to the construction industry. Unstable soils may cause damage to buildings, fences, swimming pools, parking areas, and other areas and structures. Soils may swell or shrink, causing rising and falling of the ground and ground surfaces, as well as shifting of the ground. The problem is caused mainly by the presence in soils of unstable clays, clays which absorb and desorb water, which are commonly known as swelling clays. The most common of these clays are montmorillinite and bentonite. Instability of soils around buildings and other structures and in other areas may cause cracking of foundations and pavement, tilting of structures, cracking of walls, and general deterioration.

It has long been known that the addition of lime to such soils will counteract the swelling tendencies of the clays. But no completely satisfactory method of lime introduction has been available. Often for satisfactory stabilization of the soil it is necessary that the lime be dispersed through the soil to a substantial depth. Treatments as deep as 15 or 20 feet, or even deeper, are sometimes required before the soil can be made sufficiently stable for support of structures.

According to the invention, methods and apparatus for satisfactory introduction of lime, or other suitable stabilizing materials, to soils has been provided. An injection tool of novel design is provided by the invention which will satisfactorily disperse lime into soil formations, under pressure, but without loss of pressure during the injection. In use of the apparatus according to the invention the tool itself is sealed to the ground above the slurry injection ports to prevent return to surface of the slurry until such time as a considerable underground pressure build-up has occurred. For injection to different depths, the invention provides tools of different lengths to reach different distances beneath the ground surface.

A primary object of the invention is to provide methods for introduction of lime and other soil stabilizing materials to beneath the surface of the ground. A further object of the invention is to provide sub-surface introduction of soil stabilizing materials under pressure. Still another object of the invention is to provide apparatus capable of injecting soil stabilizing material at diverse depths beneath the ground surface. A further object of the invention is to provide such apparatus which provides a self-sealing feature to prevent unwanted return to surface of the treating material.

Other objects and advantages of the invention will appear from the following detailed description of the preferred embodiments of the methods and apparatus, reference during the description being made to the accompanying drawings.

BRIEF DESCRIPTIONS OF THE DRAWINGS

FIGS. 2–4 are schematic drawings illustrating the methods according to the invention, and illustrating a modification of the apparatus.

DESCRIPTION OF THE PREFERRED EMBODIMENTS

Figure 1:
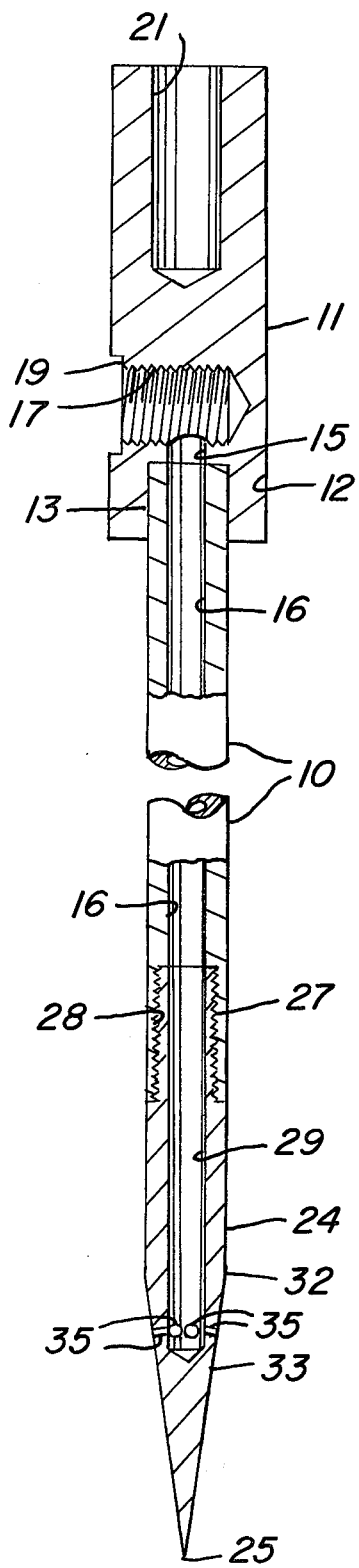
FIG. 1 is a vertical cross section of a preferred form of apparatus according to the invention.

Referring now to the drawings, and first to FIG. 1, there is shown an apparatus of preferred form according to the invention, useful for carrying out the methods of the invention. The apparatus includes a length of heavy walled pipe 10, conveniently about 4 feet in length, to the upper end of which is affixed a fitting 11. Fitting 11 is outwardly cylindrical and at its lower end has a socket 12 into which the upper end 13 of pipe 10 is secured, as by press fitting, welding, or other suitable connection. A passage 15 of circular cross section and of the same diameter as the passage 16 of pipe 10 extends a short distance to a threaded side-opening inlet 17 of fitting 11. The side of fitting 11 is relieved to a flat surface 19 around inlet 17. Inlet 17 is provided for engagement by a hose or pipe coupling screwed thereinto, through which slurried soil stabilizing material is introduced through pipe 10.

At its upper end fitting 11 has a coaxial cylindrical opening 21 larger in diameter than passage 15 extending to a depth about half the length of fitting 11. Opening 21 at the top of fitting 11 is provided for engagement by an air hammer, or the like, used for driving the apparatus into the ground.

At the lower end of pipe 10, the apparatus has a tip element 24 terminating in a sharp pointed tip 25. At its upper end fitting 24 has a reduced threaded formation 27 adapted to be tightly screwed into threaded socket 28 at the lower end of pipe 10. This connection between 24 and pipe 10 is exteriorly smooth, that is there are no interruptions of the smooth outer surface of the apparatus across the joint. The joint at 27, 28 and the press fitted connection at 12, 13 are at least substantially liquid tight so that only insubstantial leakage will occur.

Tip element 24 has longitudinal passage 29 of the same diameter as passage 16 of pipe 10, extending partially therethrough from its upper end. The passage 29 terminates downwardly a short distance below the shoulder 32 where the angular surface 33 of tip 25 commences. Fitting 24 is cylindrical downwardly from its upper end to shoulder 32 and therebelow at 33 converges conically inwardly toward tip 25. This structure is important to the invention. It has been found that this shape of the tip causes a seal to be formed around the apparatus when the apparatus is driven into the ground. The conical tip surface 33 on penetrating downwardly through the soil compresses the soil outwardly to form a layer of compressed soil annularly around the tool as the tool is driven deeper. The maximum soil pressure around the tool occurs just above shoulder 32, below which ports 35 are disposed. When lime-water slurry is jetted from ports 35, the slurry penetrates angularly downward and outward into the soil. As slurry injection continues, the pressure builds up around the tip 24 of the tool. The soil seal around the tool above shoulder 32 increases the magnitude of the pressure around the tool tip which can be built up before the slurry commences returning to surface around the tool. Were it not for the shape of the tool tip, and the consequent seal formed around the tool above shoulder 32 below which ports 35 are disposed, slurry surfacing would occur at considerably lesser pressures and the treated area around the tool would be much less in diameter. The seal is formed just above shoulder 32. A plurality of ports 35 are provided from the lower end of passage 29 to the exterior of the tool, angled slightly downward outwardly. Since the seal with the soil is formed above the level of exit of the ports 35, when pressured fluid is introduced through the ports into the soil the seal immediately thereabove is effective in preventing return to surface of the treating slurry.

If soil treatment at any side of the tool is not desired, the ports 35 at that side of the tool tip may be closed or omitted. For example, tip 24 may have ports 35 at only one-half of its circumference, for use in treating soil to one side of the tool while leaving the soil at the other side of the tool substantially untreated.

Referring now to FIGS. 2–4 of the drawings, the apparatus shown in FIG. 1, formed by pipe 10 and fittings 11, 24, is first driven into the ground to the required depth preferably by an air hammer 37 which engages in passage 21 of fitting 11. Other means for driving the apparatus into the ground may be alternatively employed, for example, the tool may be simply pushed by hand into the soil if the soil is sufficiently soft, or a sledge hammer or the like may be used to drive the tool into the ground if desired. The commencement of driving the apparatus into the ground is illustrated in FIG. 2, and the tool completely driven into the ground is illustrated in FIG. 3.

If it is desired to treat the soil at a greater distance below the ground surface than the length of the apparatus, then apparatus extension elements such as those illustrated in FIG. 4 may be employed. In FIG. 4, the apparatus is shown to have a bottom element 40, intermediate element 41, and upper element 42. Element 40 is like that illustrated in FIG. 1 except that at its upper end it has a reduced threaded formation identical with formation 27 of tip fitting 24. Element 41 has a lower threaded socket identical with socket 28 and has a threaded formation 27 at its upper end. Element 42 is pressed fitted into fitting 11 as at connection 12, 13 (FIG. 1) at its upper end, and has a lower threaded socket formation 28 at its lower end. In this manner, the length of the tool is substantially tripled. Tools or apparatuses of any required length may be formed in like manner.

Referring now particularly to FIGS. 2–3, but remembering that the apparatus as shown in FIG. 4 may alternatively be employed, hose 44 is connected to side inlet 17 of fitting 11 by a suitable connection fitting 45 screwed into the threads of inlet 17. The other end of hose 44 is connected to the outlet of a pump 48. Pump 48 is connected to a tank 49 by conduit 50 having valve 51. Pump 48 is preferably of a type which will develop a pressure of between 150 and 200 psig at an injection rate whereby 12 to 15 gallons of slurry is injected into the soil in two to three minutes. Tank 49 may be provided with a stirrer 53, or other suitable mixing device. Tank 49 may rest upon the ground or may be supported by a truck or trailer or any other suitable arrangement for use near the point where the injection apparatus is to be used.

Lime, water and a suitable detergent are mixed in a tank 49. The detergent may be omitted, but it is preferred that a suitable drilling detergent, of the type used in drilling oil wells and the like, be added at a rate of approximately 5 gallons per 1,000 gallons of water. Lime is added at a rate of about 3 pounds of lime per gallon of water, the completed mixture having a viscosity of about 40 centipoises. The lime used is preferably dry hydrated lime. The mixture weighs about 9½ pounds per gallon.

The apparatus is used by connecting the apparatus as shown in FIG. 3, with the injection apparatus made up of elements 10, 11, and 24 disposed at the point where injection of the stabilizing material into the soil is required. The injection apparatus is driven into the ground, as by air hammer 37, and then pump 48 is started in operation, with valve 51 being open. The pressured fluid at a pressure preferably between 150 psig and 200 psig, is injected into the soil around the tool at a slight downward angle from the angled ports 35 of tip 24, slurry penetration to 5 to 7 feet around the tool usually being accomplished. The penetration of the slurry usually extends from the level of ports 35 to about 2 feet therebelow. Injection is continued until such time as the injected slurry surfaces around pipe 10. This surfacing of the slurry is delayed by the heretofore described seal formed around element 24, beyond the time when such surfacing would normally be expected. Slurry does not penetrate upwardly to the surface around the tool until such time as the pressure at the lower end of the tool, i.e. the pressure of injection of the slurry into the soil, has built up to a high pressure of greater than the normal injection pressure. Such pressure build up occurs as the slurry is injected because of saturation of the soil area around the tool. When the surfacing occurs, the tool is either moved to a different location for treatment of additional soil areas, or may be moved to a different depth in the soil for a further treatment.

When several treatments at different depths are to be done, the treatment is preferably first performed at a level closer to the ground surface and then moved to a deeper depth. In order that the described seal formation by the soil around the tool tip may be provided, the tool, adjusted to suitable length by extension joints if necessary, is re-driven into the ground for each depth of treatment. When a area greater than the area of a single treatment is required, the treatments are usually spaced about 5 feet apart so that all of the intervening area between treatment sites will be treated.

The lime injection prevents swelling of swelling clays, such as montmorillinite or bentonite, or the like, and permanently stabilizes the soil so that buildings and foundations and parking areas, and the like, will not be subject to subsequent shifting and damage.

While preferred embodiments of the methods and apparatus have been described, many modifications thereof may be made by a person skilled in the art without departing from the spirit of the invention, and it is intended to protect by Letters Patent all forms of the invention falling within the scope of the following claims.

I claim:

1. Apparatus for use in delivering fluid stabilizing material to subsurface soil under pressure with minimal return to surface of the fluid stabilizing material along the path of the apparatus, comprising elongate conduit means of uniform outer diameter throughout its length without any inward depressions or outward projections along its length whereby it may be driven longitudinally into the ground without disturbing the walls of its penetration path, head means at the upper end of said conduit means having a fluid flow inlet communicating with the interior of said conduit means, said inlet having connection means for connection of said inlet to a separate conduit, tip means at the lower end of said conduit means having a cylindrical upper portion of the same outer diameter as said conduit means and a downwardly diminishing conical portion therebelow terminating downwardly in a pointed tip, the exterior of said lower end of said conduit means at the junction therebetween and said tip means having smoothly reduced to said pointed tip, said tip means having passage means extending longitudinally therethrough downwardly from said junction terminating above said pointed tip and having at least one laterally disposed fluid outlet port extending from the lower end of said passage to exit at a reduced portion of said tip means, whereby when said tip means and conduit means are driven into the ground the soil through which the same are driven is compressed outwardly by downward movement of the reduced portions of said tip means to form an uninterrupted annular ring of compressed soil around said upper portion of tip means and around said conduit means above said outlet ports and thereby forming a seal around said apparatus to prevent flow of fluid stabilizing material injected from said outlet ports into the soil upwardly around said.

2. The combination of claim 1, said head means having a cylindrical recess thereinto at its end opposite said conduit means for receiving a tool for driving said conduit means downwardly into the ground.

3. The combination of claim 1, including at least one additional length of said conduit means serially connectable therewith for extending the length of said apparatus for soil conditioning treatments at increased depths.

4. The combination of claim 1, said outlet ports being disposed angularly downwardly whereby fluid jetted from said outlet ports enters soil beneath said tip means.

\* \* \* \* \*